United States Patent
McGreer et al.

(10) Patent No.: US 6,787,868 B1
(45) Date of Patent: Sep. 7, 2004

(54) MICROLENSES FOR INTEGRATED OPTICAL DEVICES

(75) Inventors: Kenneth McGreer, Fremont, CA (US); Ming Yan, Pleasanton, CA (US); Brian McGinnis, Sunnyvale, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 117 days.

(21) Appl. No.: 09/962,909

(22) Filed: Sep. 25, 2001

(51) Int. Cl.[7] .......................... H01L 29/82; H01L 43/00
(52) U.S. Cl. ...................................... 257/425; 257/443
(58) Field of Search ............................... 257/425, 426, 257/432, 436, 443, 451

(56) References Cited

U.S. PATENT DOCUMENTS

| | | | |
|---|---|---|---|
| 4,128,302 A | 12/1978 | Di Vita | 350/96.18 |
| 4,547,262 A | 10/1985 | Spillman, Jr. et al. | 156/659.1 |
| 4,566,753 A | 1/1986 | Mannschke | 350/96.16 |
| 4,715,027 A | 12/1987 | Mahapatra et al. | 370/3 |
| 4,815,084 A | 3/1989 | Scifres et al. | 372/46 |
| 5,157,746 A | 10/1992 | Tobita et al. | 385/33 |
| 5,195,150 A | 3/1993 | Stegmueller et al. | 385/33 |
| 5,210,801 A | 5/1993 | Fournier et al. | 385/14 |
| 5,457,569 A | 10/1995 | Liou et al. | 359/344 |
| 5,515,464 A | 5/1996 | Sheem | 385/49 |
| 5,528,717 A | 6/1996 | Schwering et al. | 385/129 |
| 5,768,450 A | 6/1998 | Bhagavatula | 385/24 |
| 5,805,755 A | 9/1998 | Amersfoort et al. | 385/131 |
| 5,854,868 A | 12/1998 | Yoshimura et al. | 385/50 |
| 5,917,980 A | 6/1999 | Yoshimura et al. | 385/129 |
| 5,930,423 A | 7/1999 | Chen et al. | 385/49 |
| 6,243,524 B1 | 6/2001 | Funabashi | 385/129 |
| 6,549,696 B1 * | 4/2003 | Uetsuka et al. | |

OTHER PUBLICATIONS

Maru, K, et al. "Lowe–loss arragyed–waveduide grating with high index regions at slab–to–array interface," Electronics Letters, Oct. 11, 2001, vol. 37 No. 21.

* cited by examiner

Primary Examiner—Phuc T. Dang
(74) Attorney, Agent, or Firm—Amin & Turocy, LLP

(57) ABSTRACT

The invention provides integrated optical matching elements for use in integrated optical devices. The matching elements each comprise one or more lenses. The lenses may have low index contrast with the surrounding medium. Required dioptric power is achieved by using a train of lenses. Optical matching elements according to the invention can be used to enhance the optical coupling between channel waveguides and slab waveguides. The insertion loss of devices such as optical power splitters, optical couplers and arrayed waveguide grating routers can be reduced by incorporating optical matching elements according to the invention.

100 Claims, 14 Drawing Sheets

MICROLENSES FOR INTEGRATED OPTICAL DEVICES

TECHNICAL FIELD

This invention is in the field of integrated optical devices. The invention relates to apparatus for coupling light into channel waveguides. The invention relates particularly to integrated optical devices which incorporate one or more lenses situated to efficiently couple light into a channel waveguide. The invention has particular application to arrayed waveguide gratings but may be used in other optical devices. Another aspect of the invention relates to lenses for use in integrated optical circuits.

BACKGROUND

Integrated optical devices of various kinds can be made by combining optical elements, such as waveguides, lenses, arrayed waveguide gratings and others. Such devices are typically formed within an optical layer on a generally flat substrate and hence are described generically as planar lightwave circuits (PLCs).

PLCs typically comprise various combinations of planar waveguides and/or channel waveguides. Such waveguides are described by H. Kogelnik, "Theory of Optical Waveguides," in Guided-Wave Optoelectonics T. Tamir ed., Springer-Verlag, Berlin, 1988, and also by H. Nishihara, M Haruna, and T Suhara, Optical Integrated Circuits, McGraw Hill, New York, 1987.

In a slab waveguide (sometimes referred to as a planar waveguide), light is restricted to propagate in a region that is thin (typically between 3 μm and 10 μm) in one dimension, referred to herein as the lateral dimension, and extended (typically between 1 mm and 100 mm) in the other two dimensions. A plane that is perpendicular to the lateral dimension of the PLC is defined as the plane of the PLC. The longitudinal direction is defined as the direction of propagation of light at any point on the PLC; the lateral direction is defined to be perpendicular to the plane of the PLC; the transverse direction is defined to be perpendicular to both the longitudinal and the lateral directions.

Light propagating along a channel waveguide in a PLC has an optical field that is substantially confined in both the lateral direction and the transverse direction. In a typical channel waveguide, the field is substantially confined within a region that extends between 3 μm and 10 μm in the lateral direction, herein referred to as the height, and extends between 3 μm and 100 μm in the transverse direction, herein referred to as the width.

Slab waveguides may have various constructions. Constructions which use doped-silica are usually preferred because such constructions have attractive properties including low cost, low loss, low birefringence, stability, and compatibility for coupling to fiber. A typical doped-silica slab waveguide comprises a core layer of silica glass lying between top and bottom cladding layers of silica glass. The layers are doped so that the core layer has a higher index of refraction than either the top or bottom cladding layers. When layers of silica glass are used for the optical layers, the layers are typically deposited on a silicon wafer.

Slab waveguides may also be made using materials other than silica glass. For example, a slab waveguide may comprise three or more layers of InGaAsP. In this example, adjacent layers have compositions with different percentages of the constituent elements In, P, Ga, and As. Slab waveguides may also be made using layers of optically transparent polymers or a layer of a material having a graded index such that the region of highest index of refraction is bounded by regions of lower indices of refraction.

Channel waveguides may have constructions similar to slab waveguides with the addition of side cladding material that limits the transverse extent of the waveguide. The side cladding material has an index of refraction that is lower than that of the core material. The side cladding layer and top cladding layer are usually made of the same material.

There are various optical devices in which light propagating in a free propagation region, such as a slab waveguide, is coupled into one or more channel waveguides. An example of such a device is an arrayed waveguide grating router (AWGR). In a typical AWGR, light from one or more input ports is coupled into a first slab waveguide. The first slab waveguide is, in turn, coupled to a second slab waveguide by an arrayed waveguide grating (AWG). Light propagates through the second slab waveguide. The second slab waveguide is coupled to at least one output port.

An AWG comprises a plurality of channel waveguides. The length of the $i^{th}$ waveguide in the AWG is denoted as $L_i$. The angular dispersion that is provided by the AWG is determined in part by the difference in length between adjacent waveguides, $L_{i+1}-L_i$. Details of construction and operation of AWGRs are described in M. K. Smit and C. Van Dam, PHASAR-Based WDM-Devices: Principles, Design, and Application, IEEE Journal of Selected Topics in Quantum Electronics, vol. 2, no. 2, pp. 236–250 (1996); K. McGreer, Arrayed Waveguide Gratings for Wavelength Routing, IEEE Communication Magazine, vol. 36, no. 12, pp. 62–68 (1998); and K. Okamoto, Fundamentals of Optical Waveguides, pp. 346–381, Academic Press, San Diego, Calif., USA (2000). Each of the publications and patents referred to in this application is herein incorporated by reference in its entirety. The particular output port to which light entering the AWGR at a particular input port is most strongly coupled is wavelength-dependent. Possible applications of AWGRs include, but are not limited to demultiplexing, multiplexing, or providing N×N routing.

An important consideration in the design of PLC devices, such as AWGRs, is that the insertion loss provided by the device should be small. It is a challenge to realize an AWGR with an insertion loss that is less than an insertion loss specification for a particular application. Many factors contribute to insertion loss including:

- coupling losses where optical fibers are coupled to the PLC;
- losses associated with the diffraction of light into diffraction orders that are not coupled to any output channel waveguide;
- coupling losses between the AWG region and the input slab waveguide; and,
- coupling losses between the AWG region and the output slab waveguide.

In certain devices it is also very important to minimize any back-reflection of light.

Dragone, U.S. Pat. No. 5,002,350, discloses that the coupling loss between a slab waveguide region and an AWG region may be reduced by providing adjacent channel waveguides of the AWG with a separation that is sufficiently large to substantially prevent mutual optical coupling in at least one region of the AWG and by making the separation between adjacent channel waveguides of the AWG sufficiently small to provide substantial mutual optical coupling in the region where the channel waveguides are coupled to the slab waveguide. In this region, it is preferred that adjacent channel waveguides have a separation that is as small as possible within the limits imposed by the fabrication process.

Li, U.S. Pat. No. 5,745,618, discloses another construction for reducing the coupling loss between a slab waveguide region and an AWG region. $L_i$ provides a transition region between the grating region and the slab waveguide region. The transition region comprises silica paths that traverse the waveguides of the grating. By arranging the silica paths to have widths that increase as the slab region is approached, the mode transition is made more gradual. This can reduce transition loss.

AWGRs having vertically tapered waveguides are disclosed in A. Sugita, A Kaneko, K. Qkamoto, M. Itoh, A. Himeno, and Y. Ohmori, "Very low insersion loss arrayed-waveguide grating with vertically tapered waveguide," IEEE Photon. Technol. Lett. Vol. 12, no. 9, Pp. 1180–1182 (2000) and J. C. Chen, and C. Dragone, "A proposed design for ultra-low loss waveguide grating routers," IEEE Photon. Technol. Lett., Vol. 10, no., Pp. 379–381 (1998).

Despite the extensive research that has been carried out to date with a view to reducing the insertion loss of PLCs, there remains a need for alternative ways to construct devices, such as AWGRs, which have reduced insertion loss.

The prior art discloses various constructions for lenses which may be incorporated in PLCs.

Bhagavatula, U.S. Pat. Nos. 5,253,319 and 5,612,171 disclose lenses which may be integrated into planar optical waveguides. The lenses each comprise an interface adjacent a cavity. The cavity is either empty (i.e. has an index of refraction that is substantially equal to 1.0) or is filled with a material having an index of refraction that is substantially higher than the index of refraction of the core material in the optical waveguide exterior to the lens. Bhagavatula teaches that it is desirable to maintain a substantial difference between the refractive indices of the cavity and the adjacent core regions of the optical waveguide.

Bhagavatula discloses various devices which use such lenses including an 1×N optical coupler and a M×N optical coupler. The 1×N coupler comprises a slab waveguide with one input channel waveguide optically coupled to one side of the slab waveguide and N output channel waveguides optically coupled to the opposite side of the slab waveguide. The boundary of the lens that is proximal to the input channel waveguide comprises one curved arc configured to collimate the light that emerges from the input channel waveguide. The boundary of the lens that is proximal to the output channel waveguides comprises N arcs; each arc is configured to focus the collimated light into its respective output channel waveguide. In general, the M×N couplers described in U.S. Pat. Nos. 5,253,319 and 5,612,171 have lenses configured so that, according to geometric optics, the light that emerges from each input channel waveguide forms N images and each image location corresponds to the location of one of the output channel waveguides.

The literature describes various devices which include a plurality of integrated optical lenses arranged to suit a particular application. These include:

Schwering et al., U.S. Pat. No. 5,528,717, which discloses a beam waveguide for millimeter and sub-millimeter wave regions which comprises a plurality of integrated cylindrical lenses spaced apart along the bean waveguide; and, Fournier et al., U.S. Pat. No. 5,210,801, discloses various optical devices, some of which incorporate a plurality of integrated lenses.

The literature describes various lens constructions and methods for fabricating lenses in integrated optical devices. The literature includes:

M. M. Minot and C. C. Lee, "A new guided-wave lens structure," J. Lightwave Technol., vol. 8, no. 12, Pp. 1856–1862, (1990) which discloses a lens formed with a semiconductor waveguide exterior to the lens and a different semiconductor waveguide interior to the lens;

Aagard, U.S. Pat. No. 4,141,621, which discloses a plasma-etching process for producing integrated lenses;

Stoll, U.S. Pat. No. 4,755,014, which discloses another technique for making integrated lenses;

Gidon et al. U.S. Pat. No. 4,865,453 which discloses an integrated optical displacement transducer which includes a lens formed by reactive ion etching a silica substrate to provide an air-filled cavity; and, Spillman, U.S. Pat. No. 4,547,262 which discloses an integrated optical lens formed by proton exchange.

Notwithstanding the above mentioned techniques, there is a need for optical devices such as AWGRs which have reduced insertion loss. There is a need for an array of planar optical lenses that are easily fabricated and suitable for coupling light between an arrayed waveguide grating (AWG) and a slab waveguide.

SUMMARY OF THE INVENTION

This invention provides optical matching elements useful for combining or separating optical signals. The optical matching elements may be used for coupling light between a slab waveguide and an array of single waveguides in devices such as AWGs. Devices according to the preferred embodiments of the invention comprise an optical lens array either between the slab waveguide area and array waveguide region or between the slab waveguide region and output waveguide. The lenses may be concave (where the effective index of the lens interior is smaller than that of a region surrounding the lens) or convex (where the effective index of the lens interior is larger than that of a region surrounding the lens). The index contrast is the difference between the index of refraction (or effective index) of the lens interior and the index of refraction (or effective index) of the material(s) surrounding the lens.

In preferred embodiments of the invention the optical coupling element provides a beam having a waist of a width that provides a good mode match with the fundamental mode of the channel waveguide associated with the optical coupling element. Low index contrast lenses are preferred over high index contrast lenses for this application because high index contrast lenses reflect a larger portion of the light. This has an adverse affect on the coupling efficiency and furthermore, the reflected light may be problematic.

One aspect of the invention provides an optical apparatus comprising: a first slab waveguide; a first plurality of channel waveguides optically coupled to the first slab waveguide; and an optical matching element associated with each of the plurality of channel waveguides. The optical matching element comprises at least one lens formed in the first slab waveguide and located to couple light between the first slab waveguide and the channel waveguide.

In preferred embodiments the first slab waveguide comprises a core layer having a first index of refraction, the lens comprises an interior region having a second index of refraction, and the first index of refraction differs from the second index of refraction by less than 0.04.

Another aspect of the invention comprises a planar lightwave circuit comprising an integrated low index-contrast lens. In this specification and the appended claims the term "planar lightwave circuit" refers to a type of lightwave circuit construction and does not require mathematical planarity of the circuit or any part of it. The lens comprises an interior, and a boundary separating the interior of the lens from an exterior region of the planar lightwave circuit. The interior has a first effective index and the exterior has a second effective index. The first and second effective indices differ from one another by an amount not exceeding 0.04.

Another aspect of the invention provides an integrated optical coupler. The optical coupler comprises a first slab waveguide, at least one input port optically coupled to the first slab waveguide on a first side, a plurality of output waveguides optically coupled to the first slab waveguide on a second side opposed to the first side, and at least two integrated optical lenses disposed within the first slab waveguide. Each of the lenses is at a location adjacent to a mouth of a different corresponding one of the output waveguides. Each of the at least two lenses comprises an interior, and a boundary separating the interior of the lens from a surrounding region of the first slab waveguide. The interior has a first effective index and the surrounding region has a second effective index. The first and second effective indices differ from one another by an amount not exceeding 0.04.

In preferred embodiments each of the lenses is spaced apart from a mouth of its corresponding channel waveguide by a distance which is less than twice a focal length of the lens. The distance is preferably less than 20 $\mu$m.

The output waveguides may comprise tapered regions proximate the first slab waveguide wherein the tapered regions decrease in width with distance from the first slab waveguide.

A further aspect of the invention provides an arrayed waveguide grating router comprising: first and second slab waveguides optically coupled by an arrayed waveguide grating comprising a plurality of AWG channel waveguides; one or more first I/O channel waveguides optically coupled to the first slab waveguide; one or more second I/O channel waveguides optically coupled to the second slab waveguide; and at least one optical matching element in the first slab waveguide. The optical matching element is located in an optical path which extends through the arrayed waveguide grating router between one of the first I/O channel waveguides and one of the second I/O channel waveguides. The optical matching element comprises an optical lens integrated with the first slab waveguide.

In preferred embodiments the optical matching element comprises a train of lenses. Each of a plurality of the lenses in the train has a thickness of 20 $\mu$m or less.

Yet another aspect of the invention provides a method for providing a lens integrated in a waveguide comprising a core layer and top and bottom cladding layers. The method comprises irradiating with ultraviolet light a lens-shaped portion of the core layer of the waveguide. The method preferably includes providing a mask defining a lens shape, and irradiating with ultraviolet light a lens-shaped portion of the core layer defined by the mask. A variation of this method may be used for providing an optical matching element in a waveguide comprising a core layer and top and bottom cladding layers. The method comprises providing a mask defining a lens shape, and, changing an effective index of the core layer in a plurality of adjacent lens-shaped regions by irradiating with ultraviolet light areas of the core layer defined by the mask to provide a train of closely spaced lenses integrated in the core layer of the waveguide.

Further details, features and advantages of the invention are discussed below.

BRIEF DESCRIPTION OF THE DRAWINGS

In Figures which illustrate non-limiting embodiments of the invention.

DESCRIPTION

Figure 1:
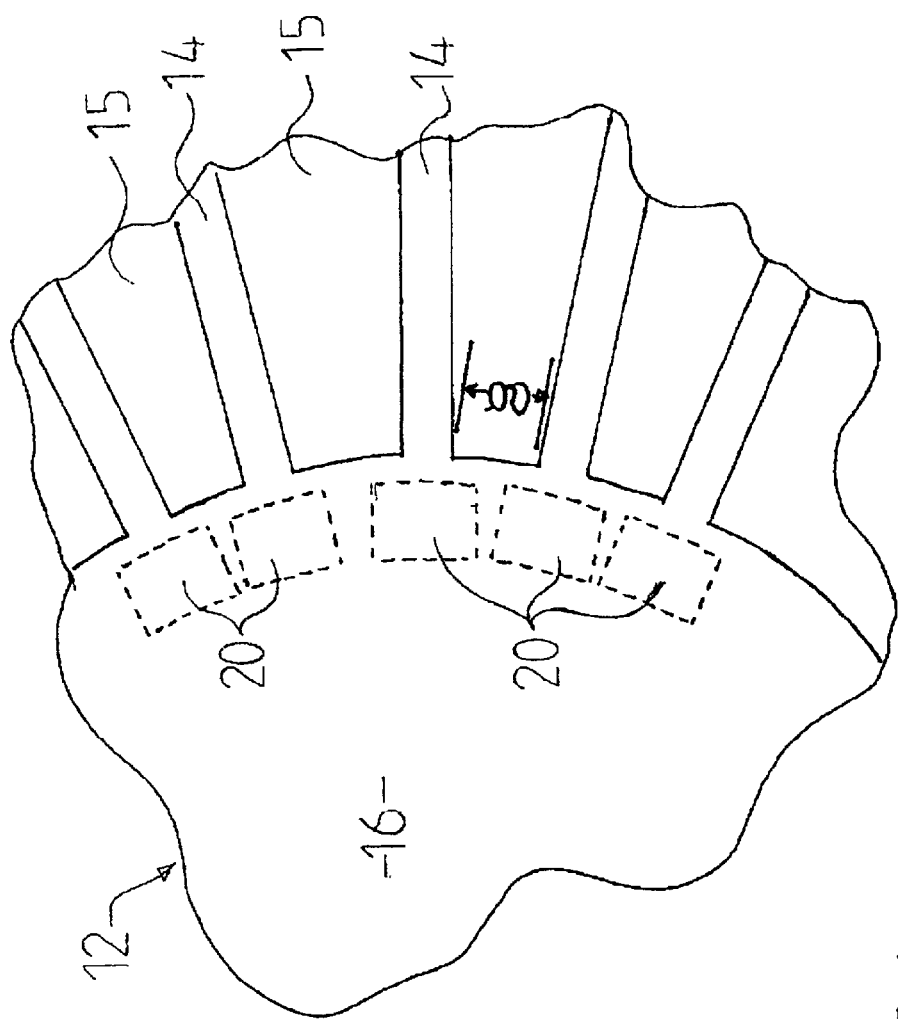
FIG. 1 is a schematic drawing illustrating a portion of a planar lightwave circuit (PLC) which incorporates optical matching elements according to the invention.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

A main aspect of this invention relates to optical devices which use integrated optical lenses to improve coupling between a free propagation region, such as a slab waveguide and one or more channel waveguides. In this disclosure, an "integrated optical lens" is a planar optical element that transforms the radius of curvature and/or the center of curvature of optical wavefronts that propagate through it. For example, an integrated optical lens may be configured to focus a diverging beam of light. In this case, light that is incident on the lens has optical phase fronts that are curved such that the center of curvature is on the input side of the lens and the light that emerges from the lens has optical phase fronts that are curved such that the center of curvature is on the output side of the lens.

The focusing effect of a lens arises in part because an interior region of the lens has a different effective index from that of a region surrounding the lens. In this specification and the appended claims, the term "effective index" refers to the speed of light in vacuum divided by the magnitude of the phase velocity of light within a particular portion of a device, such as the interior of a lens or a region exterior to a lens. If, for example, a portion of a device is made of a material having a uniform index of refraction then the effective index for that portion of the device is the same as the index of refraction of the material. If a portion of a device comprises an optical waveguide made up of several layers each having a different index of refraction then effective index may differ from the index of refraction of any layer as is understood to those skilled in the art. Use of the term "effective index" to describe optical properties of a portion of a device does not imply that the portion is or comprises an optical waveguide although it could.

An integrated optical lens has a non-uniform effective index or an effective index that is different from that of the surrounding medium.

An integrated optical lens comprises an interface between two regions of dissimilar values of effective index configured to allow light to propagate through it. This interface may be called a lens boundary. The lens boundary does not necessarily enclose any region nor does it necessarily form part of an interface that encloses a region. A lens boundary may be abrupt or gradual. The "interior" of the lens refers to the region between two lens boundaries whether the region is enclosed by an interface or not.

One design parameter of an integrated optical lens is the index contrast. The index contrast is the difference between the effective index of the material interior to the lens and the effective index of the material exterior to the lens. If the interior of the lens or the exterior of the lens is not part of a waveguide, the refractive index of the medium in that portion of the lens takes the place of the effective index in the determination of the index contrast.

A "high index contrast" lens is a lens with an index contrast of 0.04 or greater. A low index contrast lens refers to lens with an index contrast of less than 0.04. As noted above, prior art integrated optical lenses typically have high index contrast. Designers of prior art integrated optical lenses have typically attempted to maximize index contrast. The "index ratio" is related to the index contrast and refers to the value of the effective index interior to the lens divided by the effective index exterior to the lens.

FIG. 1 shows a portion of a PLC 10 in which an AWG 12 comprising a plurality of channel waveguides 14 couples to a slab waveguide 16. The coupling loss between the AWG 12 and the slab waveguide 16 may be interpreted as a mode mismatch loss. Light propagating in different ones of channel waveguides 14 in AWG 12 is substantially uncoupled. The optical intensity has a local maximum within each channel waveguide. The optical intensity in regions 16 between adjacent waveguides 14 is typically lower than the optical intensity within the adjacent waveguides.

A typical AWG has 50 or more channel waveguides 14 which carry significant optical power. Hence, the optical intensity within AWG 12 typically exhibits 50 or more local maxima. In contrast, light propagating in slab waveguide 16 has an intensity distribution that varies slowly over distances on the scale of the separation between adjacent AWG waveguides 14 and this distribution typically does not have a local minimum between adjacent waveguides 14. When the transition from one intensity distribution to a different intensity distribution is abrupt, the transition will cause substantial mode mismatch loss.

The mode mismatch loss in the region where a slab waveguide couples to an AWG (or some other collection of channel waveguides) can be minimized by forming grating waveguides 14 so that they meet slab waveguide 16 at locations which are as close together as possible. Fabrication capabilities impose limits on how closely waveguides 14 may be placed to each other. The closest that they may approach is referred to herein as the minimum gap. Mode mismatch occurs because the minimum gap is non-zero. In preferred embodiments of the invention, waveguides 14 are spaced apart from one another by gaps g not exceeding 5 $\mu$m in width.

This invention provides an array of optical matching elements 20 to reduce the mode mismatch between slab waveguide 16 and AWG 12. Each of optical matching elements 20 comprises one or more integrated optical lenses. In various embodiments of the invention optical matching elements 20 comprise:

convex integrated optical lenses;

concave integrated optical lenses; and, trains of convex or concave integrated optical lenses.

Light that propagates across slab waveguide 16 enters the plurality of optical matching elements 20. Each optical matching element 20 has a transverse span that is approximately equal to the separation of waveguides 14 at the point where they meet slab waveguide 16. Each optical matching element 22 focuses light which is incident upon it into a corresponding output channel waveguide 14 and thereby enhances the optical coupling to the output channel waveguide 14. Preferably, each optical matching element 20 couples light from slab waveguide 16 into a beam having a waist which coincides with the junction between slab waveguide 16 and the respective output channel waveguide 14. It is further preferred that the beam waist be of a width that provides a good mode match with the fundamental mode of the respective channel waveguide 14. To achieve this, the optical matching element 20 should include a lens which is spaced apart from the mouth of the corresponding channel waveguide 14 by a distance d not exceeding twice the focal length of the lens. The distance d should also not exceed twice the Rayleigh length of the lens (which is defined in Equation (2) below). In preferred embodiments of the invention the distance d is less than 20 $\mu$m.

It is preferred that the lenses in each optical matching element 20 should be low index contrast lenses because high contrast lenses reflect a larger portion of the incident light. This has an adverse affect on the coupling efficiency and furthermore, the reflected light may be problematic if PLC 10 is used in an application wherein reflected light can cause problems.

Figure 2A:
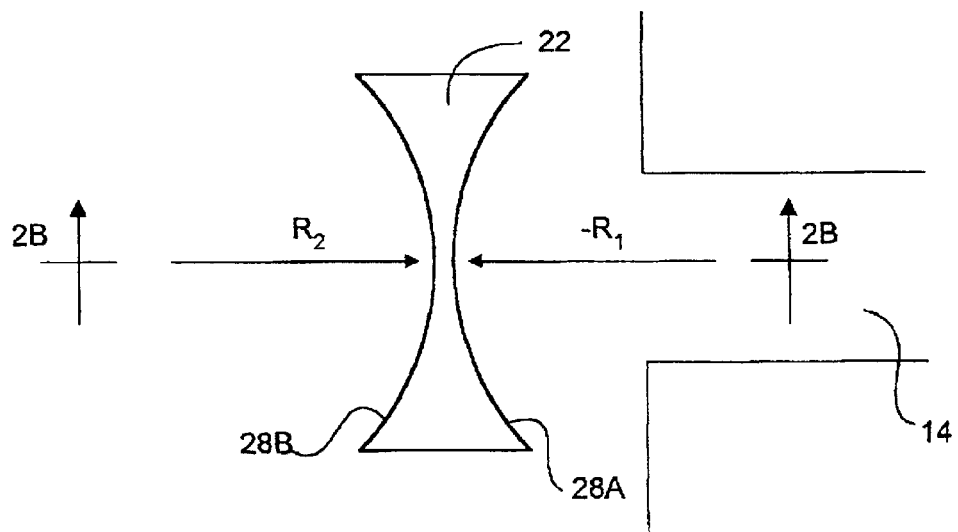
FIGS. 2A and 2B are respectively a plan view and longitudinal section through an optical matching element according to one embodiment of the invention.
Figure 2B:
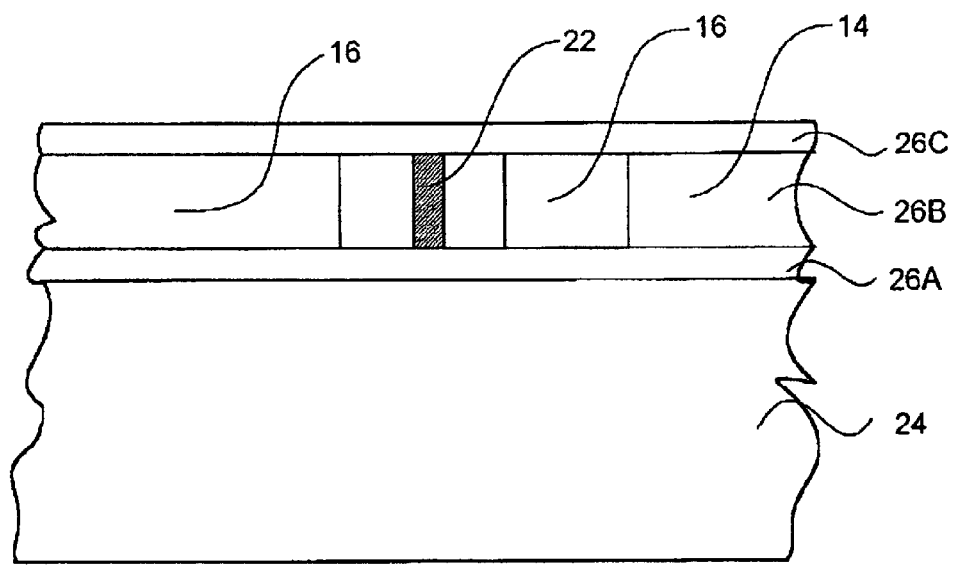

FIGS. 2A and 2B show a plan view and cross section through an optical matching element 20 comprising a biconcave integrated optical lens 22. Lens 22 is formed in a PLC which comprises a substrate 24, a bottom cladding layer 26A, a core layer 26B and a top cladding layer 26C. Lens 22 may be formed by removing a portion of core layer 26B and replacing it with a material, herein referred to as the "lens material", having an index of refraction different from that of the material of core layer 26B. An etching process, such as reactive ion etching or wet etching, is a suitable process for removing a portion of the core material. Reactive ion etching is preferred.

It is preferred that the lens material and the material of top cladding layer 26C are the same material so that a single deposition process can be used to both fill the interior of the lens and to provide top cladding layer 26C.

Lens 22 comprises curved boundaries 28A and 28B between the material of core layer 26B and the lens material. In the preferred embodiment, boundaries 28A and 28B are either circular arcs or parabolic arcs. Lens 22 is preferably a low index contrast lens, having an index contrast of less than 0.04, and most preferably of less than 0.02.

As the lens material does not provide guiding in the lateral direction it is preferable that lens 22 be thin to maintain sufficient coupling between the slab waveguide regions on either side of lens 22. Preferably, lens 22 should have a thickness of less than 10 $\mu$m. Since the index contrast is low, the interfaces 28A and 28B preferably have small radii of curvature to provide adequate dioptric power. In practice, a compromise between minimizing the thickness of a lens 22 and minimizing the radius of curvature must be found. The compromise is mathematically expressed by the lens maker's equation:

$$D = \frac{1}{f} = (n-1)\left(\frac{1}{R_1} - \frac{1}{R_2}\right) \quad (1)$$

where D is the dioptric power; f is the focal length; n is the effective index of the lens material divided by the effective index of the material exterior to lens 22; and, $R_1$ and $R_2$ are the radii of the two lens boundaries 28A and 28B respectively.

Figure 3A:
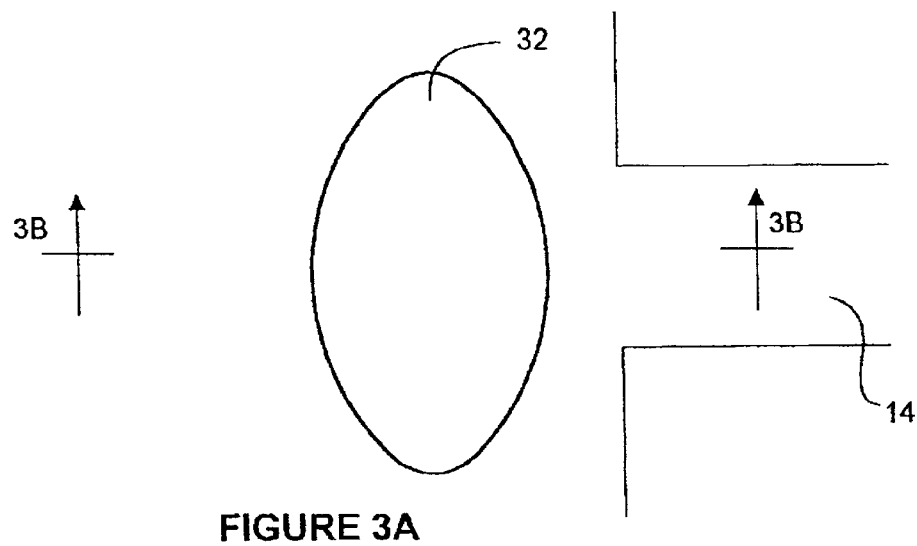
FIGS. 3A and 3B are respectively a plan view and longitudinal section through an optical matching element according to an alternative embodiment of the invention.
Figure 3B:
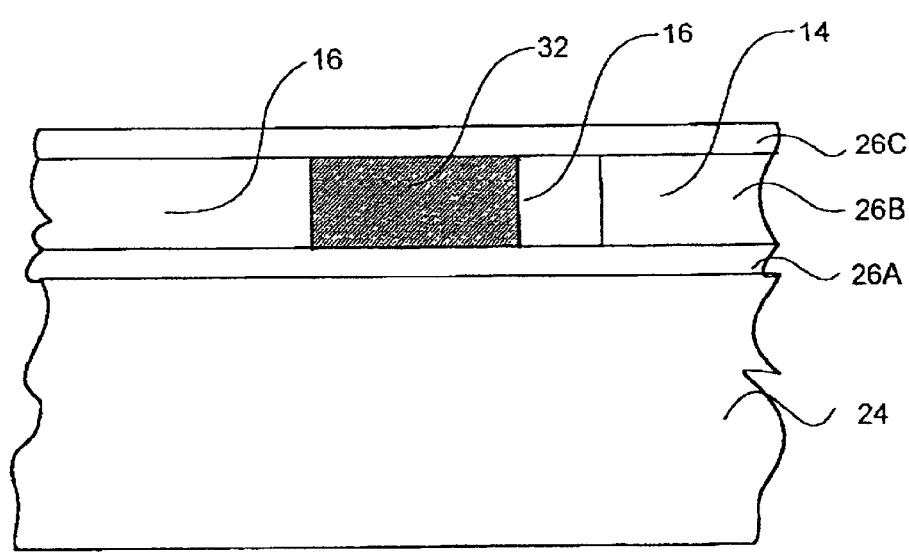

FIGS. 3A and 3B are respectively a plan view and cross section through an optical matching element 20 comprising a biconvex integrated optical lens 32. Lens 32 has an effective index greater than that of the surrounding material of core 26B so that it acts as a converging lens. Lens 32 is preferably a low index contrast lens.

Lens 32 may be formed by removing material from core layer 26B and then depositing a lens material in the resulting cavity. In the alternative, lens 32 may be formed by treating the material of core layer 32 to change its index of refraction. In some materials the index of refraction can be altered by ultra-violet (UV) irradiation. Where core layer 26B is made of such a material, lenses 32 may be formed by irradiating core layer 26B with ultraviolet light. Hill K., et al. "*Photosensitivity in optical waveguides: Application to reflection filter fabrication*, Appl. Phys. Lett. 32(10),647 (1978) discloses that the index of refraction of certain materials, such as germanium-doped silica can be selectively increased by UV irradiation. A number of refinements have been made to the original technique. For example, U.S. Pat. No. 6,221,566 discloses a technique that includes hydrogen loading, UV irradiation and thermal annealing. In another example, international patent application No. WO 01/23923 A1 discloses a technique that includes selecting a soft silica glass material and using scanned UV exposure to densify the glass. In yet another example, U.S. Pat. No. 6,226,433 B1 discloses a method that includes the application of heat and UV irradiation to a glass material formed by flame hydrolysis deposition.

Selective UV irradiation of core layer 26B to provide lenses 32 may be achieved by providing a mask bearing images of lenses 32 and then imaging the mask onto the PLC using ultraviolet light, for example, from a UV laser. Preferably the image of the mask on core layer 26B is optically reduced so as to enhance the resolution with which lenses 32 are defined. The lens is preferably thermally annealed after UV irradiation.

Selective UV irradiation of core layer 26B may also be achieved by direct laser writing with a focused UV beam. The beam can be scanned over lens shaped areas in core layer 26B.

Forming lenses 32 by UV irradiation can be performed after other aspects of the fabrication of a PLC have been completed. Providing lenses 32 which have been formed by UV irradiation offers the advantage that the absence of an abrupt physical interface between different materials at the boundaries of lenses 32 is diffuse rather than abrupt. The absence of an abrupt interface at the boundaries of lens 32 reduces the amount of light that is reflected or scattered at the boundaries of lenses 32.

Figure 4A:
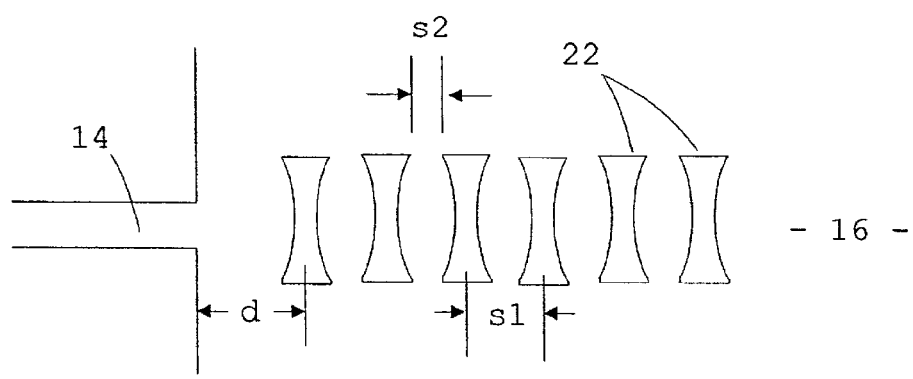
FIGS. 4A and 4B are plan views of optical matching elements comprising trains of lenses according to two embodiments of the invention.
Figure 4B:
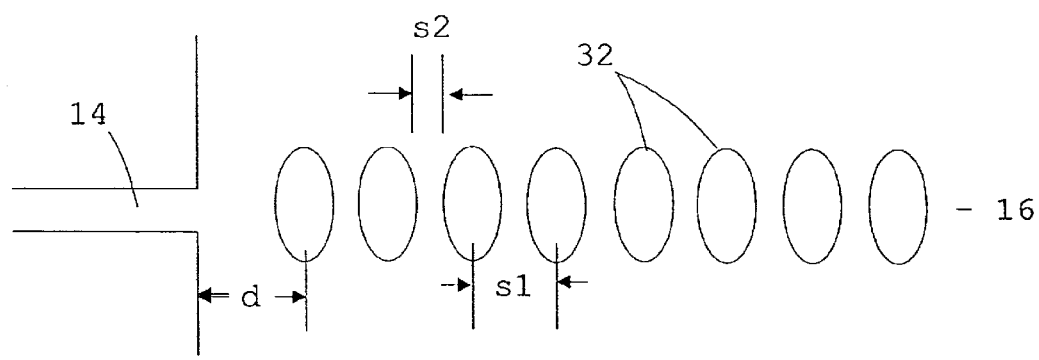

In preferred embodiments of the invention, each optical matching element 20 comprises a train of lenses. The lenses in each train may be substantially identical. FIGS. 4A and 4B illustrate optical matching elements 20 which comprise respectively a train of biconcave lenses 22 and a train of biconvex lenses 32.

Where optical matching elements 20 comprise trains of lenses then the lens in the train which is closest to a channel waveguide should be spaced apart from the mouth of the corresponding channel waveguide 14 by a distance d not exceeding twice the focal length of the lens. The distance d should also not exceed twice the Rayleigh length of the lens. In preferred embodiments of the invention the distance d is less than 20 $\mu$m.

Where the lenses in a lens train of an optical matching device 20 are low-index contrast lenses it is preferred that the lenses be located close to one another. The center-to-center separation distances S1 are preferably less than four times the focal length of the lenses. It is also preferred that S1 should be less than the Rayleigh length, which is given by:

$$z_0 = \frac{\pi w^2}{\lambda} \quad (2)$$

where w is half the width of the beam passing through the lens train as defined according to Gaussian beam optics, and $\lambda$, is the wavelength of the light in the waveguide medium adjacent and exterior to the lens. The closest distance S2 between adjacent lenses in a lens train is preferably as small as possible and is typically limited by the choice of process for making the optical matching element. In preferred embodiments of the invention, S2 is less than 5 $\mu$m. The longitudinal thickness of each lens should also be smaller than the focal length of each lens and smaller than the Rayleigh length.

By placing the lenses sufficiently to satisfy these conditions, a beam waist is typically not formed between adjacent lenses of a lens train.

For low-contrast lenses, it is further preferred to position the lenses in a lens train so that they are spaced as closely as possible. Where the lenses are formed by an etch process, microfabrication limitations typically require adjacent lens boundaries to be separated by at least 2 $\mu$m. Where the lenses are formed by a UV irradiation process, as described above, adjacent lenses can have a minimum separation which depends upon the resolution of the UV laser system used to image the lenses. A typical suitable UV laser system has may be able to achieve a resolution such that adjacent lenses can be separated from one another by approximately 1 $\mu$m. The ability to form trains of lenses which are spaced more closely than can be readily achieved using microfabrication techniques may be an advantage of the UV laser method for forming lenses.

Trains of lenses as described above are v particularly useful when the lenses are low index contrast lenses. The dioptric power (the reciprocal of the focal length) of a lens is related to the index contrast as illustrated by Equation (1). Low index contrast lenses have low dioptric powers. The dioptric power of a train of closely spaced identical lenses is larger than the dioptric power of each lens. In many configurations where the lenses in a train are separated by distances that are much smaller than the focal length of each lens, the dioptric power of the lens train is approximately equal to the sum of the dioptric powers of the individual lenses.

Preferably each lens train is configured as a beam expander. That, is, the lens train both couples an optical beam between the channel waveguide and the slab waveguide and simultaneously transforms the beam waist to a diameter that differs from the diameter that the beam has within the channel waveguide. In a beam expander, the incident beam has a waist of a width that is different from the width of the waist of the emerging beam. The term "beam expander" is used herein whether the incident beam is wider or narrower than the emergent beam. When applied to an AWG, 1×N coupler, or the like, the slab waveguide region is situated on the side of the optical matching elements that is designed for the wider waist and the channel waveguides are situated on the side of the optical matching elements designed for the narrower waist.

Figure 4C:
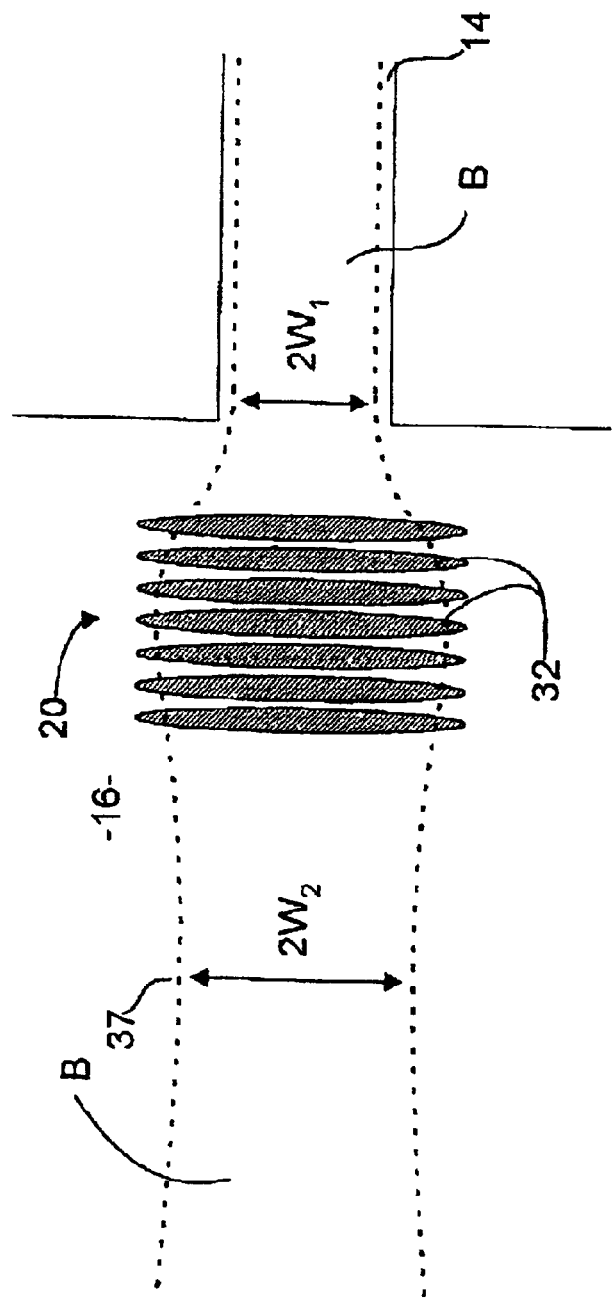
FIG. 4C is a plan view of the optical matching element of FIG. 4B disposed adjacent a channel waveguide and illustrating the optical matching element acting as a beam expander.

FIG. 4C illustrates an optical matching element 20 comprising a number of lenses 32 operating as a beam expander. A beam B of light passes from a channel waveguide 14 through the lenses 32 of optical matching element 20 and into a slab waveguide 16. In channel waveguide 14 the light of beam B propagates in a fundamental mode having a width W1. Optical matching element 20 is located close to the mouth of waveguide 14 so that beam B forms a waist 37 having a width W2 with W2>W1 on a side of optical matching element 20 opposite to channel waveguide 14.

Figure 5A:
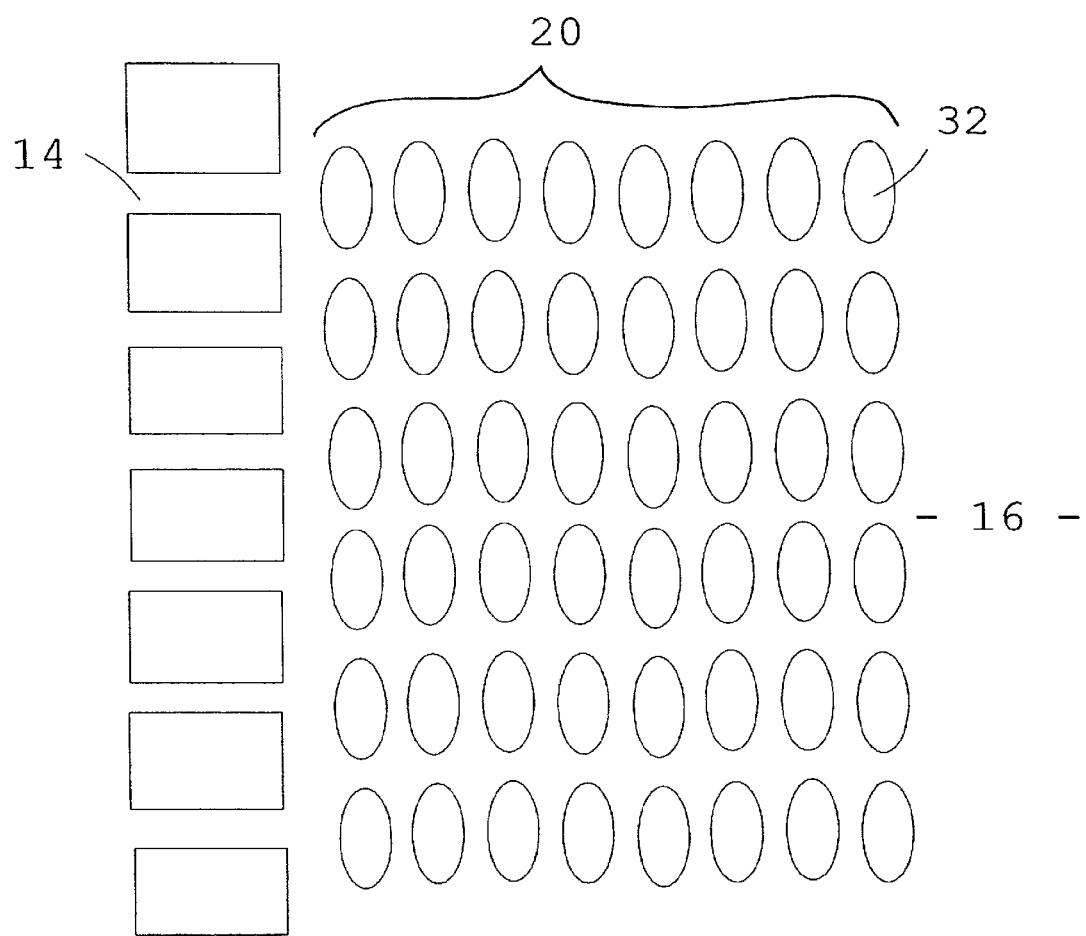
FIGS. 5A and 5B are plan views of arrays of optical matching elements comprising trains of lenses illustrating a configuration in which the optical matching elements are spaced transversely apart from one another.
Figure 5B:
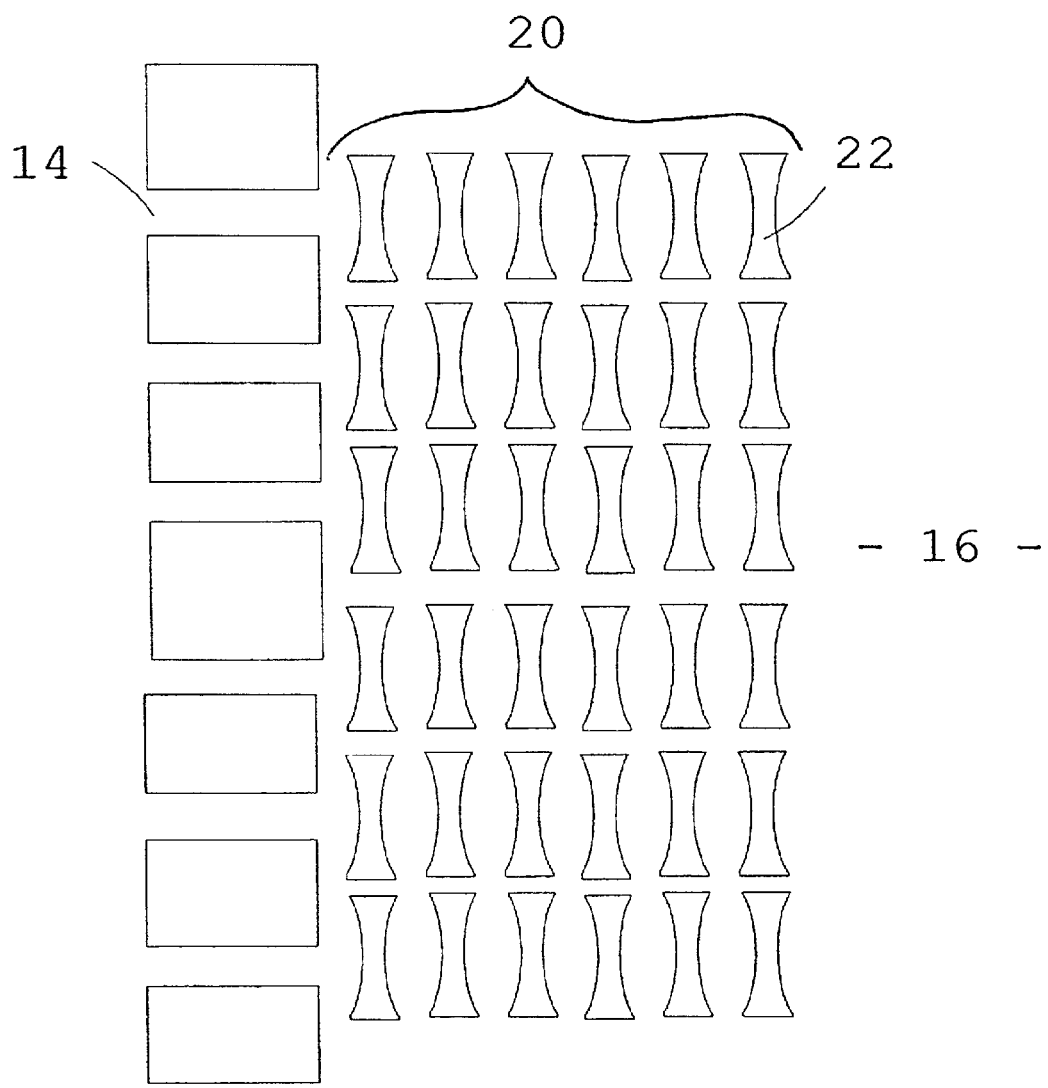
Figure 6A:
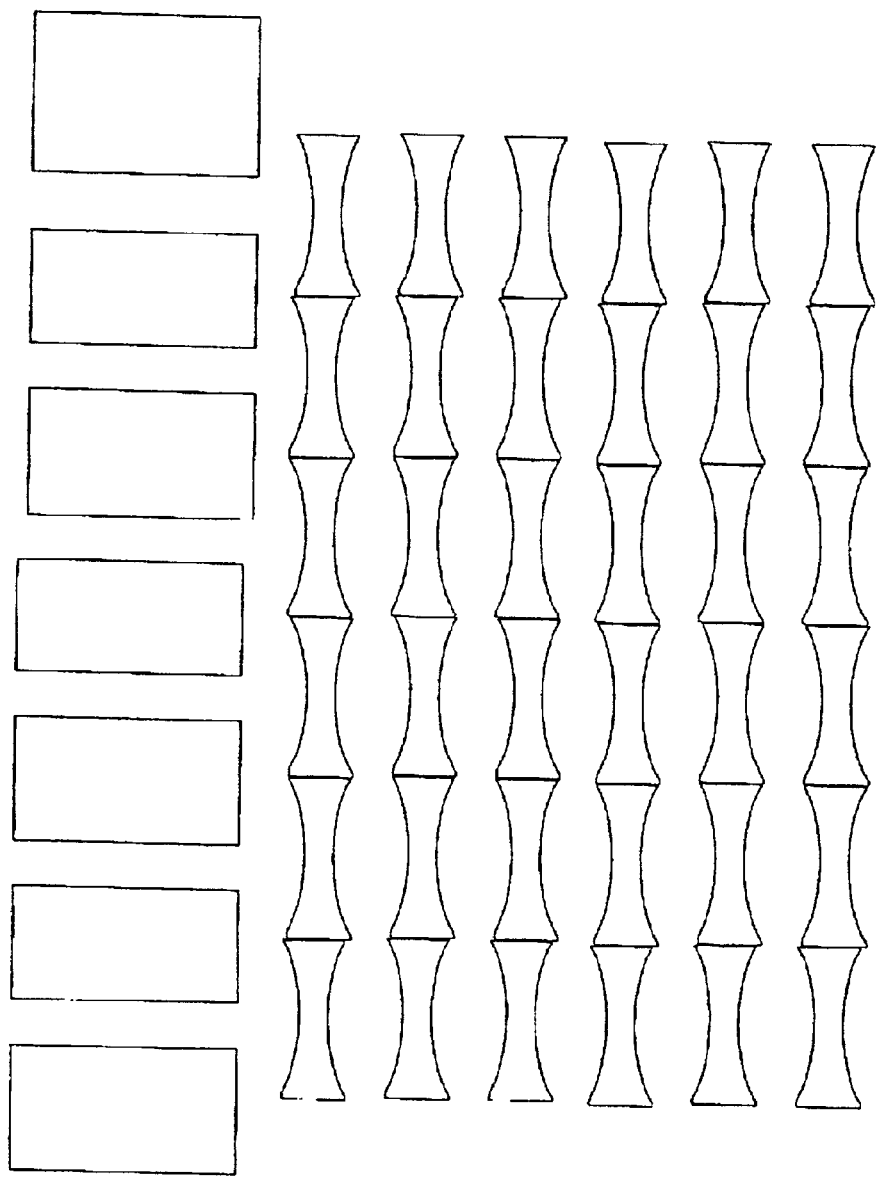
FIGS. 6A and 6B are plan views of arrays of optical matching elements comprising trains of lenses illustrating a configuration in which the optical matching elements just touch one another.
Figure 6B:
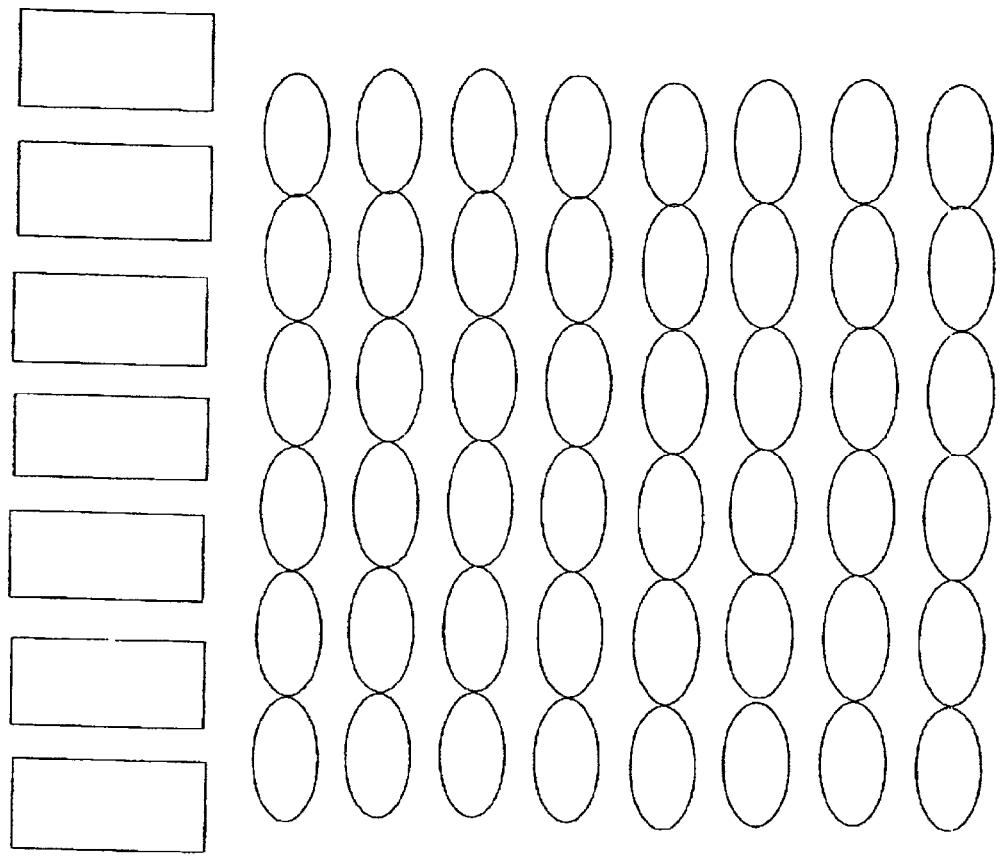
Figure 7A:
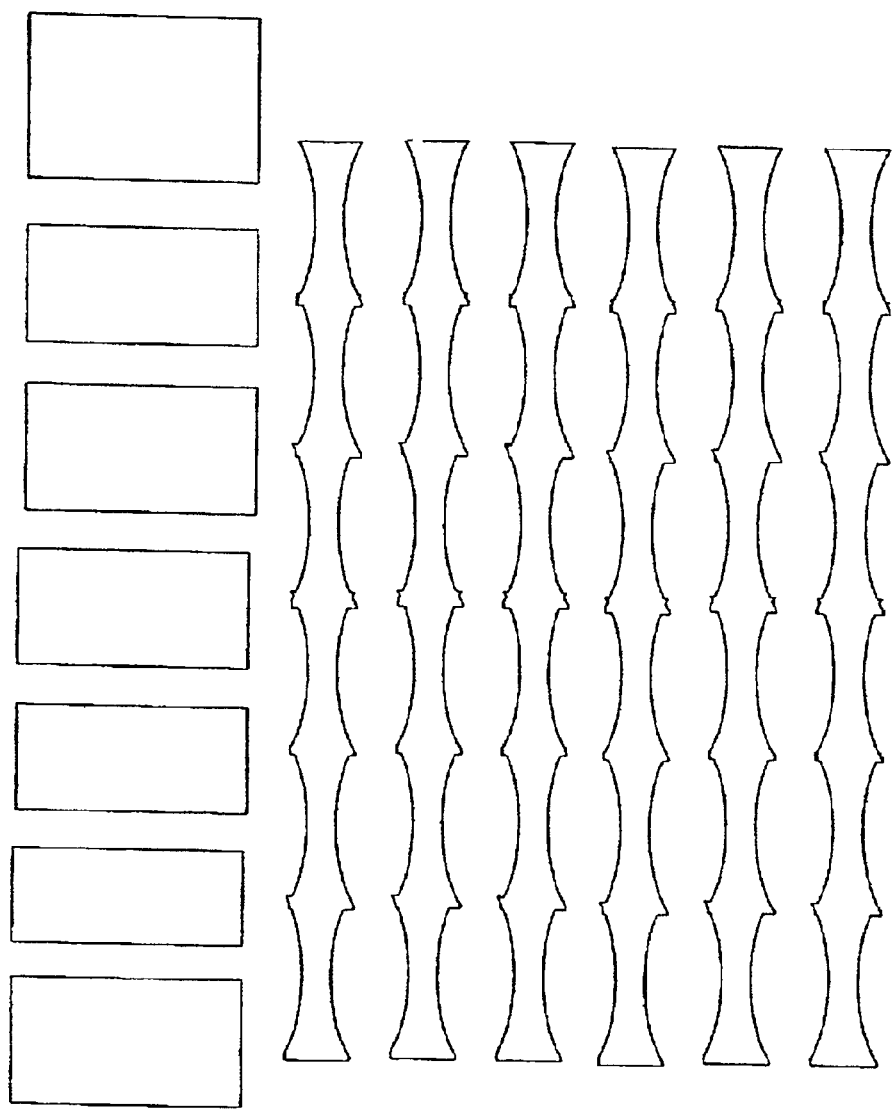
FIGS. 7A and 7B are plan views of arrays of optical matching elements comprising trains of lenses illustrating a configuration in which the optical matching elements overlap with one another.
Figure 7B:
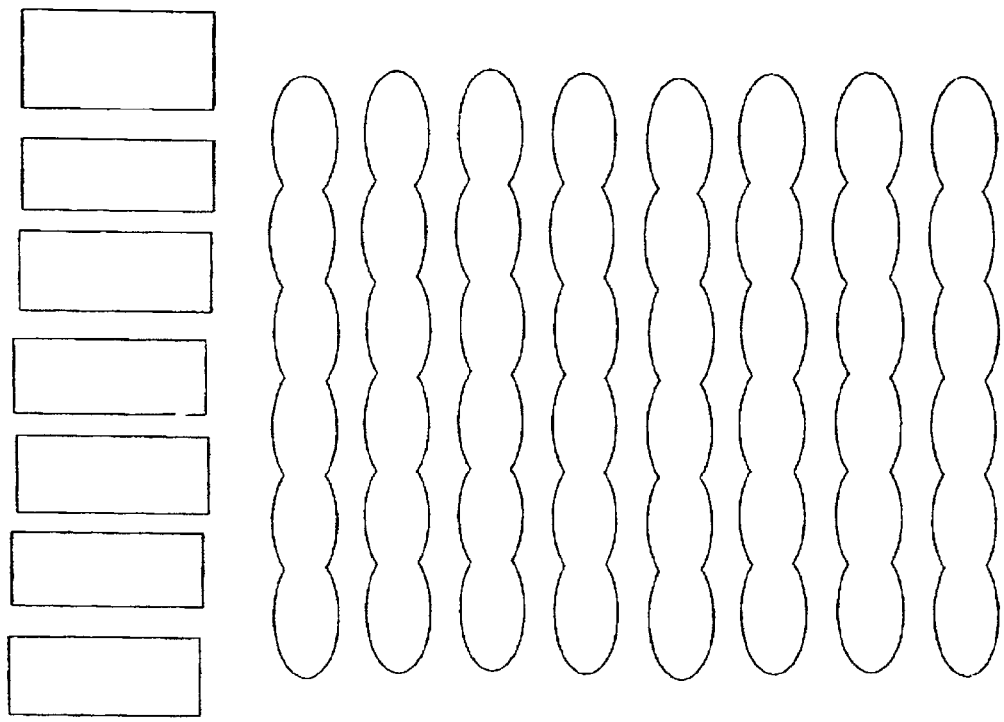

The transverse separation of the lenses which make up adjacent optical elements 20 may be varied without departing from the invention. The lenses may be slightly transversely separated, as shown in FIGS. 5A and 5B; The lenses may just touch the lenses of neighboring optical elements 20 as shown in FIGS. 6A and 6B; or the lenses may overlap slightly at their edges, as shown in FIGS. 7A and 7B. In general, each optical matching element comprises a number of interfaces at which the effective index of the material through which the light is propagating changes. Light passing through the optical matching element crosses an even number of boundaries. In the preferred embodiment each of the boundaries are curved in a manner that improves the mode matching between a channel waveguide and a slab waveguide.

Figure 8:
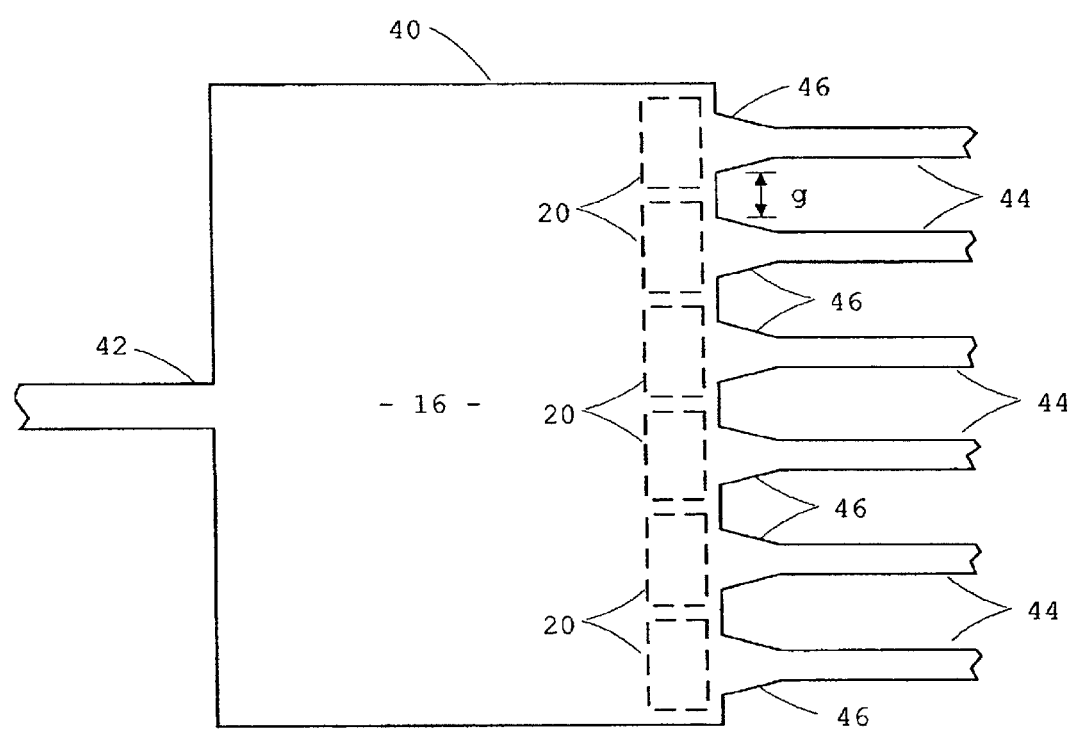
FIG. 8 is a schematic view of a 1×N optical power splitter according to the invention.

The construction described above may be applied in the fabrication of various integrated optical devices including a 1×N optical power splitter 40 as shown, for example, in FIG. 8. Optical splitter 40 comprises a slab waveguide 16, an input channel waveguide 42 optically coupled to one side of slab waveguide 16, and N output channel waveguides 44 optically coupled to the opposite side of the slab waveguide (where N is a positive integer). Preferably, the channel waveguides 42 and 44 are monolithically integrated with the slab waveguide on a single substrate. In the alternative, some or all of the channel waveguides may comprise optical fibers.

Output waveguides 44 may also include tapered portions 46 in which the waveguide narrows in width with distance away from slab waveguide 16. Preferably, each output waveguide 44 is separated from its immediately neighboring output waveguides 44 by 10 μm to 20 μm at the points where they meet the slab waveguide. Hence W, the total length span over which output waveguides 44 are disposed along slab waveguide 16, is preferably in the range of N×10 μm to N×20 μm. Preferably, the distance across slab waveguide 16 from the input waveguide 42 to output waveguides 44 is within a factor of two of W/NA, where NA is the numerical aperture of input waveguide 42, which is typically in the range of about 0.5 and 0.3.

An optical matching element, 20 as described above is associated with and situated proximate to at least one of output waveguides 44. Preferably optical matching elements 20 are associated with each of a plurality of output waveguides 44. The plurality of output waveguides 44 does not necessarily include all of output waveguides 44. Most preferably an optical matching element 20 is associated with each one of output waveguides 44. Each optical matching element 20 preferably comprises at least one low index contrast lens, and most preferably a train of low index contrast lenses, integrated within the slab waveguide.

In operation, light is coupled from input channel waveguide 42 into slab waveguide 16, whereupon it diffracts so that it is nominally distributed transversely across a span that is determined by the numerical aperture of input channel waveguide 42.

A 1×N optical power splitter as shown in FIG. 8 may be operated with light propagating in the reverse direction as an N×1 optical combiner. In this case, input channel waveguide 42 functions as an output waveguide and the N output waveguides 44 function as input waveguides. Those skilled in the art will understand that, while the terms "input" and "output" waveguides are used herein, these terms do not require light to be propagating in a particular direction unless otherwise expressly stated. In some cases the term I/O waveguide is used herein as a neutral term to describe a waveguide without being specific regarding the direction(s) in which light is propagating in the H waveguide. In some applications an I/0 waveguide may operate as an "input" waveguide. In others it may operate as an "output" waveguide. In other applications light may simultaneously propagate in both directions in an I/O waveguide.

When the device 40 of FIG. 8 is operated as an optical combiner, light that is mutually coherent propagates through channel waveguides 44. At the point where channel waveguides 44 join slab waveguide 16, the optical field comprises a transverse array of optical beams. Each beam is separated by a finite distance that depends in part on the size of the gaps between waveguides 44. Each beam is coupled into its respective optical matching element 20. The optical matching elements 20 operate as beam expanders. As the beams emerge from optical matching elements 20 they have a larger beam waist and, consequently, the nominal gap between adjacent beams is reduced. As a result, collectively the beams couple with improved efficiency into the field that is the far field projection of the fundamental mode of channel waveguide 42.

Stated in other terms, the collective field of the beams at the point where channel waveguides 44 meets slab waveguide 16 comprises local maxima within each channel waveguide 44 and local minima that are nominally between each pair of adjacent channel waveguides 44. Optimal coupling into the far field of the fundamental mode of channel waveguide 42 is provided when this modulation depth is as small as possible. Optical matching elements 20 transform the light that initially comprises relatively isolated beams, i.e., a field with a high modulation depth, into a field comprising relatively overlapping beams, i.e., a field with a lower modulation depth. This improves the coupling efficiency. The portion of the light that is coupled into this field converges as it propagates across the slab waveguide and couples into channel waveguide 42.

Figure 9:
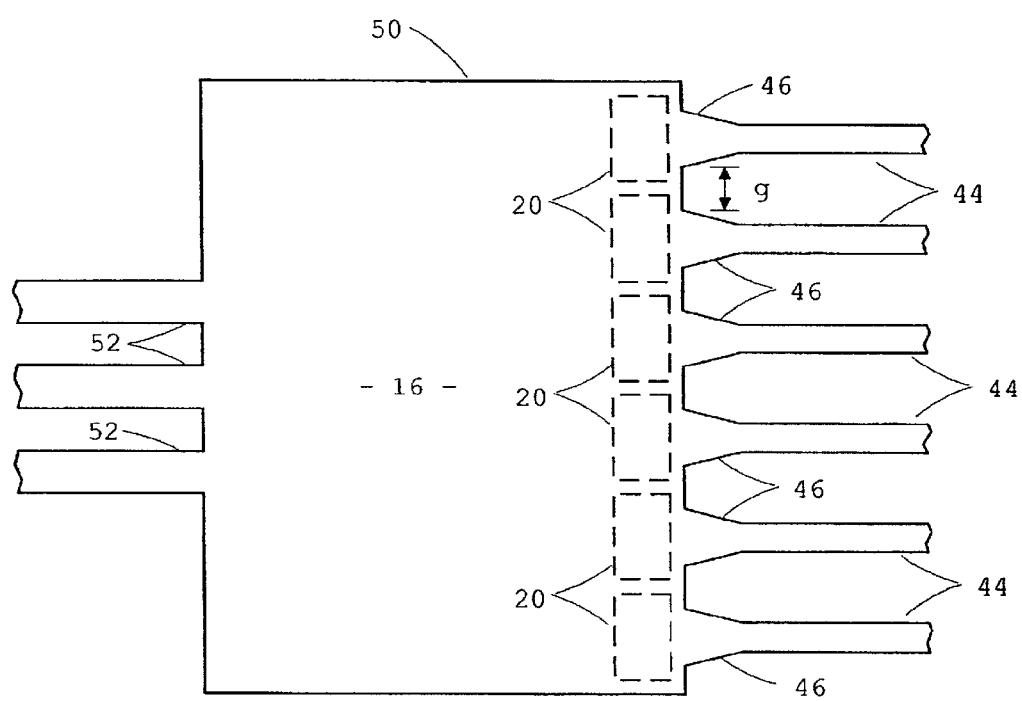
FIG. 9 is a schematic view of a M×N optical coupler according to the invention; and, FIG. 10 is a schematic view of an arrayed waveguide grating router (AWGR) according to the invention.

The construction described above may be applied in the fabrication of a M×N optical coupler 50, as illustrated in FIG. 9. Optical coupler 50 is substantially similar to optical splitter 40 of FIG. 9 except that instead of one input channel waveguide 42 it has M input waveguides 52 (where M is a positive integer). In this configuration, an optical matching element 20 is located near each of the N output waveguide 44. Light entering input waveguides 52 is typically not mutually coherent.

In operation, assuming the light from each input channel is not coherent with the light from the other input channels, the propagation of the light from each input channel can be analyzed without regard to the light from the other input channels and operation is analogous to that of 1×N power splitter 40. Light may also propagate through M×N optical coupler 50 in the reverse direction. In this case, if the light entering the individual channel waveguides 44 is coherent, then the operation of optical coupler 50 is analogous to that of power splitter 40 when it is operated as an N×1 combiner, as described above.

Figure 10:
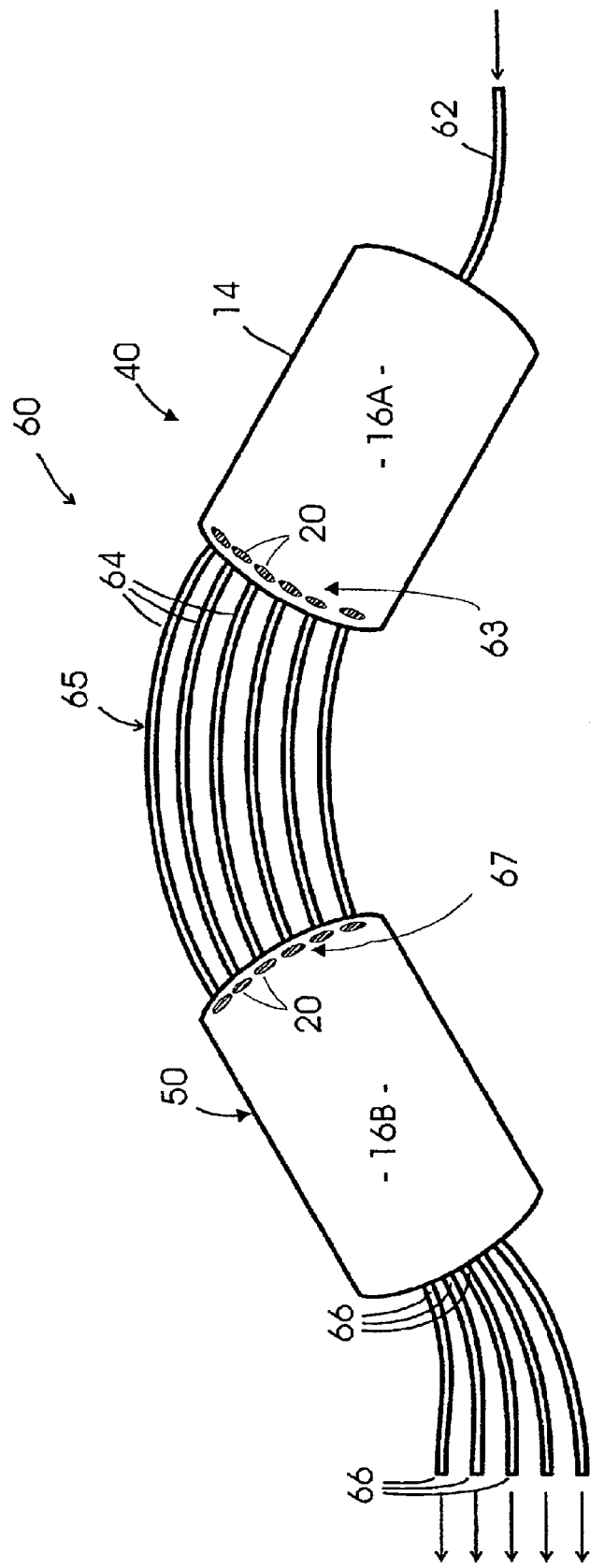

As shown in FIG. 10, the invention may also be applied to the construction of an arrayed waveguide grating router (AWGR) 60. AWGR 60 comprises at least one of a 1×N power splitter, an N×1 optical combiner, or an M×N optical coupler, each of which is described above. In the example of FIG. 10 AWGR 60 comprises a 1×N power splitter 40 which connects an input waveguide 62 to a plurality of N arrayed grating waveguides 64 (collectively referred to herein as an arrayed waveguide grating (AWG)) and an N×M optical coupler 50. Optical coupler 50 couples the N grating waveguides 64 to M output waveguides 66.

In the illustrated embodiment, an array of optical matching elements 20 is located in the slab waveguides adjacent each end of each grating waveguides 64. Preferably the optical matching elements use low index contrast lenses. High index contrast lenses reflect a larger portion of incident light, which has an adverse affect on the coupling efficiency. Furthermore, reflected light may cause problems in systems such as telecommunication systems. Preferably each optical matching element comprises a train of low index contrast lenses. In one variation the low index contrast lenses are formed by conversion of the material of core layer 26B by a process such as UV irradiation.

In general, as in the prior art, an AWGR according to the invention may have P input channel waveguides 62 and Q output channel waveguides 66 (where P and Q are positive integers).

An AWGR according to the invention may have optical matching elements 20 in one or both of its slab waveguides.

An AWGR according to the invention may be used as a demultiplexer, a multiplexer, or more generally as an optical router. In operation as a demultiplexer, light comprising of signals in a plurality of optical frequency bands enters an input channel waveguide 62. The light propagates across the input slab waveguide 16A whereupon it enters a first array 63 of optical matching elements 20 (preferably the first array of optical matching elements 20 comprises a lens train for each channel waveguide 64 of the AWG 65). The first array 63 of optical matching elements 20 focuses the light into the channel waveguides 64 of AWG 65 thereby enhancing the efficiency of coupling into the AWG. The light then propagates through the waveguides of AWG 65. Since the light in each waveguide of AWG 65 originated from a common source, the light is mutually coherent.

The light emerges from AWG 65 into output slab waveguide 16B in the form of an array of coherent beams. A second array 67 of optical matching elements 20 (preferably configured as a lens train for each waveguide 64 of AWG 65) provides enhanced coupling of the light within each optical frequency band into a field the corresponds to the far field pattern of the fundamental mode of the output channel waveguide(s) 66 associated with the optical frequency band of the light. Hence, light is separated into a plurality of output channel waveguides 66 according to its optical frequency.

The AWGR operates as a multiplexer when the direction of propagation of light is reversed from that described above.

To demonstrate the principle of this invention, a number of AWGRs generally as shown in FIG. 10 were fabricated. Each AWGR had first and second arrays of optical matching elements located adjacent to the grating waveguides in the input and output slab waveguides respectively. Each of the optical matching elements comprised a train of low-contrast lenses. The AWGR design was optimized as a 20×1 multiplexer with input channel waveguides designed to accept optical signals separated from one another in frequency by 200 Ghz.

The AWG channel waveguides were 12.5 $\mu$m wide at the point where they met each slab waveguide and they were separated by gaps of 3.5 $\mu$m so that the center-to-center separation of the waveguides was 16 $\mu$m. Three test AWGRs were fabricated. The test AWGRs differed from one another only by the number of lenses in the train of each optical matching element. The test AWGRs had respectively 10, 15 and 20 lenses per lens train.

In the test AWGRS, each lens had a longitudinal thickness of 9.1 $\mu$m and the center-to-center separation of two adjacent lenses in the lens train was 12.6 $\mu$m. The boundaries of the lens surfaces were circular arcs and the radius of curvature of each surface of the lens was 12 $\mu$m. The effective index exterior to the lenses was approximately 1.455 and the index of refraction of the material within the lens was approximately 1.445, hence the index contrast was approximately 0.01. The focal length of each lens was roughly 900 $\mu$m. The Rayleigh length for each lens was roughly 100 $\mu$m.

A control AWGR which was identical in construction to the test AWGRs except that it lacked optical matching elements was also fabricated. Relative to the control, the transmissivity of the worst-case output channel waveguide of the test AWGRs was improved by 0.7 dB when the optical matching elements consisted of trains of 10 lenses; by 1.0 dB when the optical matching elements consisted of trains of 15 lenses; and by 1.3 dB when the optical matching elements consisted of trains of 20 lenses. Here the worst-case channel is refers to the output channel waveguide with the lowest transmissivity.

The optical matching elements of the invention may be applied in integrated optical devices of other types than those described above. One aspect of this invention is that a train of low dioptric power, low index contrast lenses may be used in applications which have previously used high index contrast lenses to achieve the required dioptric power.

For example, an optical matching element comprising an integrated optical lens train may be used to couple light between two optical channel waveguides. The channel waveguide on one side of the optical matching element may comprise a semiconductor laser and the channel waveguide on the other side of the optical matching element may comprise an optical fiber.

Where a component (e.g. an assembly, device, waveguide, coupler, etc.) is referred to above, unless otherwise indicated, reference to that component (including a reference to a "means") should be interpreted as a reference to any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

- The lenses used in optical matching elements 20 are not necessarily biconvex or biconcave, as described above. Other lens configurations such as plano-convex, or plano-concave may also be used in lenses of optical matching elements according to the invention;
- In the above devices which have channel waveguides optically coupled to a slab waveguide, the channel waveguides do not need to be integrated with the slab waveguide but may also comprise optical fibers or semiconductor lasers or the like;
- In the above description the optical matching elements have been described as including only converging lenses. The optical matching elements 20 may also include diverging lenses. In some applications a train of low index contrast diverging lenses may be used in an application which requires a higher dioptric power diverging lens. When the lens material is has a lower index of refraction than the core material, as is the case when the top cladding material is used as for the lens material, a biconcave lens acts as a converging lens and a biconvex lens acts as a diverging lens. When the lens material has a higher index of refraction than the core material a biconcave lens acts as a diverging lens and a biconvex lens acts as a converging lens.
- In cases where an apparatus has a number of elements, a reference to "a plurality of" the elements means two or more of the elements. The plurality does not necessarily include all of the elements unless expressly stated or implicitly required. For example, if an apparatus is stated to have an optical matching element associated with each of a plurality of channel waveguides then the apparatus may include some channel waveguides which do not have an associated matching element.

Accordingly, the scope of the invention is to be construed in accordance with the substance defined by the following claims.

What is claimed is:

1. An optical apparatus comprising:
   a first slab waveguide;
   a first plurality of channel waveguides optically coupled to the first slab waveguide; and
   a plurality of optical matching elements, each of the plurality of optical matching elements associated with a corresponding one of the plurality of channel waveguides, the optical matching element comprising at least one lens formed in the first slab waveguide and disposed to couple light between the first slab waveguide and the channel waveguide.

2. The optical device of claim 1 wherein the first slab waveguide comprises a core layer having a first index of refraction, the lens comprises an interior region having a second index of refraction, and the first index of refraction differs from the second index of refraction by less than 0.04.

3. The optical device of claim 1 wherein the optical matching element comprises a train of lenses.

4. The optical device of claim 3 wherein the train comprises of 10 or more lenses.

5. The optical device of claim 3 wherein the train comprises 5 or more lenses.

6. The optical device of claim 5 wherein the first slab waveguide comprises a core layer having a first index of refraction, the lenses each comprise an interior region having a second index of refraction, and, for one or more of the lenses in the train, the first index of refraction differs from the second index of refraction by less than 0.04.

7. The optical device of claim 3 wherein the lens train comprises a closest lens which is closest to the channel waveguide and the closest lens is spaced apart from a mouth of the channel waveguide by a distance less than twice a focal length of the closest lens.

8. The optical device of claim 3 wherein the lens train comprises a closest lens which is closest to the channel waveguide and the closest lens is spaced apart from a mouth of the channel waveguide by a distance less than twice a Rayleigh length of the closest lens.

9. The optical device of claim 3 wherein the lens train comprises a closest lens is closest to the channel waveguide and the closest lens is spaced apart from a mouth of the channel waveguide by a distance less than 20 $\mu$m.

10. The optical device of claim 3 wherein each of a plurality of the lenses in the train are separated from an adjacent lens in the train by a space having a width not exceeding 5 $\mu$m.

11. The optical device of claim 3 wherein each of a plurality of the lenses in the train has a thickness of 20 $\mu$m or less.

12. The optical device of claim 3 wherein, for each lens in the train, center-to-center distances between the lens and any adjacent lenses in the train do not exceed four times a focal length of the lens.

13. The optical device of claim 3 wherein, for each lens in the train, center-to-center distances between the lens and any adjacent lenses in the train do not exceed twice a Rayleigh length of the lens.

14. The optical device of claim 3 wherein, for each lens in the train, center-to-center distances between the lens and any adjacent lenses in the train do not exceed 20 $\mu$m.

15. The optical device of claim 1 wherein the first slab waveguide comprises a core layer of a first material and a top cladding layer of a second material and the lens comprises a body of the second material in a cavity in the core layer.

16. The optical device of claim 1 wherein the first slab waveguide comprises a core layer and the lens comprises a region within the core layer in which an index of refraction of the core layer has been altered.

17. The optical device of claim 1 wherein the optical matching element comprises a beam expander.

18. The optical device of claim 1 wherein the lenses of transversely adjacent one of the optical matching elements are spaced apart from one another.

19. The optical device of claim 1 wherein the lenses of transversely adjacent ones of the optical matching elements touch one another.

20. The optical device of claim 1 wherein the device includes an optical power splitter and comprises a second channel waveguide coupled to the first slab waveguide on a side of the first slab waveguide opposed to the first plurality of channel waveguides.

21. The optical device of claim 20 wherein the device includes an optical coupler comprising a plurality of second channel waveguides coupled to the first slab waveguide on a side of the first slab waveguide opposed to the first plurality of channel waveguides.

22. The optical device of claim 1 wherein the device includes an arrayed waveguide grating and the first plurality of channel waveguides comprise waveguides of the arrayed waveguide grating.

23. The optical device of claim 2 wherein the device includes an arrayed waveguide grating and the first plurality of channel waveguides comprise waveguides of the arrayed waveguide grating.

24. The optical device of claim 3 wherein the device includes an arrayed waveguide grating and the first plurality of channel waveguides comprise waveguides of the arrayed waveguide grating.

25. The optical device of claim 5 wherein the device includes an arrayed waveguide grating and the first plurality of channel waveguides comprise waveguides of the arrayed waveguide grating.

26. The optical device of claim 12 wherein the device includes an arrayed waveguide grating and the first plurality of channel waveguides comprise waveguides of the arrayed waveguide grating.

27. The optical device of claim 15 wherein the device includes an arrayed waveguide grating and the first plurality of channel waveguides comprise waveguides of the arrayed waveguide grating.

28. The optical device of claim 22 comprising a second slab waveguide wherein the arrayed waveguide grating optically couples the first and second slab waveguides.

29. The optical device of claim 28 comprising an optical matching element associated with each of the plurality of channel waveguides, the optical matching element comprising at least one lens formed in the second slab waveguide and located to couple light between the second slab waveguide and the channel waveguide.

30. The optical device of claim 29 wherein the plurality of channel waveguides comprise a majority of the channel waveguides of the arrayed waveguide grating.

31. The optical device of claim 1 wherein the optical device is a planar lightwave circuit.

32. The optical device of claim 1 wherein the optical device is an arrayed waveguide grating router.

33. The optical device of claim 1 wherein the first slab waveguide comprises a 1×N power splitter.

34. The optical device of claim 1 wherein the first slab waveguide comprises a N×1 optical combiner.

35. The optical device of claim 1 wherein the first slab waveguide comprises a M×N optical coupler.

36. An optical apparatus comprising:
a slab waveguide;
a plurality of channel waveguides optically coupled to the slab waveguide; and
a plurality of optical matching elements, each of the plurality of optical matching elements associated with a corresponding one of the plurality of channel waveguides, the optical matching element comprising a train of lenses formed in the slab waveguide and disposed to couple light between the slab waveguide and the plurality of channel waveguides.

37. The optical device of claim 36 wherein the first slab waveguide comprises a core layer having a first index of refraction, the lens comprises an interior region having a second index of refraction, and the first index of refraction differs from the second index of refraction by less than 0.04.

38. The optical device of claim 36 wherein the train comprises of 10 or more lenses.

39. The optical device of claim 36 wherein the train comprises 5 or more lenses.

40. The optical device of claim 39 wherein the slab waveguide comprises a core layer having a first index of refraction, the lenses each comprise an interior region having a second index of refraction, and, for one or more of the lenses in the train, the first index of refraction differs from the second index of refraction by less than 0.04.

41. The optical device of claim 36 wherein the lens train comprises a closest lens which is closest to the channel waveguide and the closest lens is spaced apart from a mouth of the channel waveguide by a distance less than twice a focal length of the closest lens.

42. The optical device of claim 36 wherein the lens train comprises a closest lens which is closest to the channel waveguide and the closest lens is spaced apart from a mouth of the channel waveguide by a distance less than twice a Rayleigh length of the closest lens.

43. The optical device of claim 36 wherein the lens train comprises a closest lens is closest to the channel waveguide and the closest lens is spaced apart from a mouth of the channel waveguide by a distance less than 20 $\mu$m.

44. The optical device of claim 36 wherein each of a plurality of the lenses in the train are separated from an adjacent lens in the train by a space having a width not exceeding 5 $\mu$m.

45. The optical device of claim 36 wherein each of a plurality of the lenses in the train has a thickness of 20 $\mu$m or less.

46. The optical device of claim 36 wherein, for each lens in the train, center-to-center distances between the lens and any adjacent lenses in the train do not exceed four times a focal length of the lens.

47. The optical device of claim 36 wherein, for each lens in the train, center-to-center distances between the lens and any adjacent lenses in the train do not exceed twice a Rayleigh length of the lens.

48. The optical device of claim 36 wherein, for each lens in the train, center-to-center distances between the lens and any adjacent lenses in the train do not exceed 20 $\mu$m.

49. The optical device of claim 36 wherein the slab waveguide comprises a core layer of a first material and a top cladding layer of a second material and the lens comprises a body of the second material in a cavity in the core layer.

50. The optical device of claim 36 wherein the slab waveguide comprises a core layer and the lens comprises a region within the core layer in which an index of refraction of the core layer has been altered.

51. The optical device of claim 36 wherein the optical matching element comprises a beam expander.

52. The optical device of claim 36 wherein the lenses of transversely adjacent one of the optical matching elements are spaced apart from one another.

53. The optical device of claim 36 wherein the lenses of transversely adjacent ones of the optical matching elements touch one another.

54. The optical device of claim 36 wherein the device comprises an optical power splitter and comprises a second channel waveguide coupled to the slab waveguide on a side of the slab waveguide opposed to the plurality of channel waveguides.

55. The optical device of claim 54 wherein the device comprises an optical coupler comprising a plurality of second channel waveguides coupled to the slab waveguide on a side of the slab waveguide opposed to the plurality of channel waveguides.

56. The optical device of claim 36 wherein the device comprises an arrayed waveguide grating and the first plurality of channel waveguides comprise waveguides of the arrayed waveguide grating.

57. The optical device of claim 37 wherein the device comprises an arrayed waveguide grating and the plurality of channel waveguides comprise waveguides of the arrayed waveguide grating.

58. The optical device of claim 38 wherein the device comprises an arrayed waveguide grating and the plurality of channel waveguides comprise waveguides of the arrayed waveguide grating.

59. The optical device of claim 39 wherein the device comprises an arrayed waveguide grating and the plurality of channel waveguides comprise waveguides of the arrayed waveguide grating.

60. The optical device of claim 59 comprising an optical matching element associated with each of the plurality of channel waveguides, the optical matching element comprising at least one lens formed in the second slab waveguide and located to couple light between the second slab waveguide and the channel waveguide.

61. The optical device of claim 60 wherein the plurality of channel waveguides comprise a majority of the channel waveguides of the arrayed waveguide grating.

62. The optical device of claim 36 wherein the optical device is a planar lightwave circuit.

63. The optical device of claim 36 wherein the optical device is an arrayed waveguide grating router.

64. The optical device of claim 36 wherein the slab waveguide comprises a 1×N power splitter.

65. The optical device of claim 36 wherein the slab waveguide comprises a N×1 optical combiner.

66. The optical device of claim 36 wherein the slab waveguide comprises a M×N optical coupler.

67. An optical apparatus comprising:
a first slab waveguide comprising a core layer having a first index of refraction;
a first plurality of channel waveguides optically coupled to the first slab waveguide; and
a plurality of optical matching elements, each of the plurality of optical matching elements associated with a corresponding one of the plurality of channel waveguides, the optical matching element comprising at least one lens formed in the first slab waveguide and disposed to couple light between the first slab waveguide and the plurality of channel waveguides, the lens comprising an interior region having a second index of refraction, the first index of refraction differing from the second index of refraction.

68. The optical device of claim 67 wherein the first index of refraction differs from the second index of refraction by less than 0.04.

69. The optical device of claim 67 wherein the optical matching element comprises a train of lenses.

70. The optical device of claim 69 wherein the train comprises of 10 or more lenses.

71. The optical device of claim 69 wherein the train comprises 5 or more lenses.

72. The optical device of claim 71 wherein the first slab waveguide comprises a core layer having a first index of refraction, the lenses each comprise an interior region having a second index of refraction, and, for one or more of the lenses in the train, the first index of refraction differs from the second index of refraction by less than 0.04.

73. The optical device of claim 69 wherein the lens train comprises a closest lens which is closest to the channel waveguide and the closest lens is spaced apart from a mouth of the channel waveguide by a distance less than twice a focal length of the closest lens.

74. The optical device of claim 69 wherein the lens train comprises a closest lens which is closest to the channel waveguide and the closest lens is spaced apart from a mouth of the channel waveguide by a distance less than twice a Rayleigh length of the closest lens.

75. The optical device of claim 69 wherein the lens train comprises a closest lens is closest to the channel waveguide and the closest lens is spaced apart from a mouth of the channel waveguide by a distance less than 20 $\mu$m.

76. The optical device of claim 69 wherein each of a plurality of the lenses in the train are separated from an adjacent lens in the train by a space having a width not exceeding 5 $\mu$m.

77. The optical device of claim 69 wherein each of a plurality of the lenses in the train has a thickness of 20 $\mu$m or less.

78. The optical device of claim 69 wherein, for each lens in the train, center-to-center distances between the lens and any adjacent lenses in the train do not exceed four times a focal length of the lens.

79. The optical device of claim 69 wherein, for each lens in the train, center-to-center distances between the lens and any adjacent lenses in the train do not exceed twice a Rayleigh length of the lens.

80. The optical device of claim 69 wherein, for each lens in the train, center-to-center distances between the lens and any adjacent lenses in the train do not exceed 20 $\mu$m.

81. The optical device of claim 67 wherein the first slab waveguide comprises a core layer of a first material and a top cladding layer of a second material and the lens comprises a body of the second material in a cavity in the core layer.

82. The optical device of claim 67 wherein the first slab waveguide comprises a core layer and the lens comprises a region within the core layer in which an index of refraction of the core layer has been altered.

83. The optical device of claim 67 wherein the optical matching element comprises a beam expander.

84. The optical device of claim 67 wherein the lenses of transversely adjacent one of the optical matching elements are spaced apart from one another.

85. The optical device of claim 67 wherein the lenses of transversely adjacent ones of the optical matching elements touch one another.

86. The optical device of claim 67 wherein the device comprises an optical power splitter and comprises a second channel waveguide coupled to the first slab waveguide on a side of the first slab waveguide opposed to the first plurality of channel waveguides.

87. The optical device of claim 86 wherein the device comprises an optical coupler comprising a plurality of second channel waveguides coupled to the first slab waveguide on a side of the first slab waveguide opposed to the first plurality of channel waveguides.

88. The optical device of claim 67 wherein the device comprises an arrayed waveguide grating and the first plurality of channel waveguides comprise waveguides of the arrayed waveguide grating.

89. The optical device of claim 68 wherein the device comprises an arrayed waveguide grating and the first plurality of channel waveguides comprise waveguides of the arrayed waveguide grating.

90. The optical device of claim 69 wherein the device comprises an arrayed waveguide grating and the first plurality of channel waveguides comprise waveguides of the arrayed waveguide grating.

91. The optical device of claim 71 wherein the device comprises an arrayed waveguide grating and the first plurality of channel waveguides comprise waveguides of the arrayed waveguide grating.

92. The optical device of claim 90 comprising an optical matching element associated with each of the plurality of channel waveguides, the optical matching element comprising at least one lens formed in the second slab waveguide and located to couple light between the second slab waveguide and the channel waveguide.

93. The optical device of claim 92 wherein the plurality of channel waveguides comprise a majority of the channel waveguides of the arrayed waveguide grating.

94. The optical device of claim 67 wherein the optical device is a planar lightwave circuit.

95. The optical device of claim 67 wherein the optical device is an arrayed waveguide grating router.

96. The optical device of claim 67 wherein the first slab waveguide comprises a 1×N power splitter.

97. The optical device of claim 67 wherein the first slab waveguide comprises a N×1 optical combiner.

98. The optical device of claim 67 wherein the first slab waveguide comprises a M×N optical coupler.

99. An optical apparatus comprising:

a first slab waveguide comprising a 1×N power splitter;

a first plurality of channel waveguides optically coupled to the first slab waveguide; and a plurality of optical matching elements, each of the plurality of optical matching elements associated with a corresponding one of the plurality of channel waveguides, the optical matching element comprising at least one lens formed in the first slab waveguide and disposed to couple light between the first slab waveguide and the plurality of channel waveguides.

100. An optical apparatus comprising:

a first slab waveguide comprising a core layer having a first index of refraction, the first slab waveguide comprising at least one selected from the group consisting of a 1×N power splitter, a N×1 optical combiner, and a M×N optical coupler;

a first plurality of channel waveguides optically coupled to the first slab waveguide; and a plurality of optical matching elements, each of the plurality of optical matching elements associated with a corresponding one of the plurality of channel waveguides, the optical matching element comprising at least one lens formed in the first slab waveguide and disposed to couple light between the first slab waveguide and the plurality of channel waveguides, the lens comprising an interior region having a second index of refraction, the first index of refraction differing from the second index of refraction.

* * * * *